(12) United States Patent
Allen

(10) Patent No.: US 8,798,175 B2
(45) Date of Patent: Aug. 5, 2014

(54) COMMUNICATING WITH A SELF-CLOCKING AMPLITUDE MODULATED SIGNAL

(75) Inventor: Anthony John Allen, Los Gatos, CA (US)

(73) Assignee: Intersil Americas LLC, Milpitas, CA (US)

( * ) Notice: Subject to any disclaimer, the term of this patent is extended or adjusted under 35 U.S.C. 154(b) by 219 days.

(21) Appl. No.: 13/365,578

(22) Filed: Feb. 3, 2012

(65) Prior Publication Data

US 2012/0134394 A1 May 31, 2012

Related U.S. Application Data

(63) Continuation-in-part of application No. 12/775,517, filed on May 7, 2010, now Pat. No. 8,576,928.

(60) Provisional application No. 61/176,800, filed on May 8, 2009, provisional application No. 61/498,984, filed on Jun. 20, 2011.

(51) Int. Cl.
*H04B 3/00* (2006.01)
*H04L 25/49* (2006.01)
*H04L 25/02* (2006.01)
*H04L 7/00* (2006.01)

(52) U.S. Cl.
CPC .............. *H04L 7/0008* (2013.01); *H04L 25/49* (2013.01); *H04L 25/0292* (2013.01); *H04L 25/028* (2013.01); *H04L 25/0272* (2013.01); *H04L 25/4917* (2013.01)
USPC ........................................................ 375/257

(58) Field of Classification Search
CPC .............. H04L 7/0008; H04L 25/0272; H04L 25/4917; H04L 25/0292; H04L 25/49; H04L 25/028
USPC ........................................................ 375/257
See application file for complete search history.

(56) References Cited

U.S. PATENT DOCUMENTS

| | | |
|---|---|---|
| 4,608,702 A | 8/1986 | Hirzel et al. |
| 4,756,667 A | 7/1988 | Wyrostek et al. |
| 5,506,862 A | 4/1996 | McIntosh |
| 5,687,193 A * | 11/1997 | Abou Hassan ................ 375/282 |
| 5,835,542 A | 11/1998 | Lu |
| 6,133,709 A | 10/2000 | Puchianu |
| 6,359,973 B1 | 3/2002 | Rahamim et al. |
| 6,445,330 B1 | 9/2002 | Thomsen et al. |
| 7,366,251 B2 | 4/2008 | Luhman et al. |
| 7,444,124 B1 | 10/2008 | Loeb et al. |

(Continued)

OTHER PUBLICATIONS

Forster, "Manchester encoding: Opposing definitions resolved". Engineering Science & Education Journal 9 (6) Dec. 2000 pp. 278-280.*
Manchester code in Wikipedia printed Nov. 18, 2013.*

(Continued)

*Primary Examiner* — Juan A Torres
(74) *Attorney, Agent, or Firm* — Fogg & Powers LLC

(57) ABSTRACT

One embodiment described herein includes a method for transmitting a signal. The method includes generating a Manchester encoded data stream and combining the Manchester encoded data stream with an amplified clock signal to produce an amplitude modulated signal having a zero crossing at each edge of the amplified clock signal. The amplitude modulated signal can then be sent over a communication medium.

13 Claims, 15 Drawing Sheets

(56) References Cited

U.S. PATENT DOCUMENTS

| | | | |
|---|---|---|---|
| 7,693,216 B1* | 4/2010 | Katz | 375/239 |
| 2004/0008187 A1 | 1/2004 | Gaksch et al. | |
| 2004/0223557 A1* | 11/2004 | Luhman et al. | 375/295 |
| 2006/0055379 A1 | 3/2006 | Yamamoto et al. | |
| 2009/0243028 A1 | 10/2009 | Dong et al. | |
| 2010/0073038 A1 | 3/2010 | Pagnanelli | |
| 2010/0277231 A1 | 11/2010 | Hurrell et al. | |
| 2010/0280786 A1 | 11/2010 | Gorbold et al. | |
| 2010/0284452 A1 | 11/2010 | Allen | |
| 2010/0329381 A1* | 12/2010 | Shimizu et al. | 375/293 |
| 2011/0037759 A1* | 2/2011 | Fukuda | 345/213 |

OTHER PUBLICATIONS

"Lithium Ion Battery Montioring System", "AD7280", 2008, pp. 1-33, Publisher: Analog Devices, Inc., Published in: Norwood, MA.

"Multicell Battery Stack Monitor", "LTC6802-1", 2008, pp. 1-32, Publisher: Linear Technology Corporation, Published in: Milipitas, CA.

U.S. Patent and Trademark Office, "Notice of Allowance and Fee(s) Due", "from U.S. Appl. No. 12/775,517", Aug. 20, 2013, pp. 1-15.

U.S. Patent and Trademark Office, "Office Action", "U.S. Appl. No. 12/775,517", May 9, 2013, pp. 1-18.

U.S. Patent and Trademark Office, "Restriction Requirement", "U.S. Appl. No. 12/775,517", Mar. 29, 2013, pp. 1-5.

* cited by examiner

COMMUNICATING WITH A SELF-CLOCKING AMPLITUDE MODULATED SIGNAL

CROSS-REFERENCE TO RELATED APPLICATIONS

The present application is a continuation-in-part of U.S. patent application Ser. No. 12/775,517 (hereafter the "517 Application"), entitled "CAPACITIVE DIVIDER TRANSMISSION SCHEME FOR IMPROVED COMMUNICATIONS ISOLATION," filed on May 7, 2010, which claims the benefit of U.S. Provisional Patent Application Ser. No. 61/176,800 (hereafter the "800 Application"), entitled "A ROBUST 2-WIRE DAISY CHAIN COMMUNICATION SYSTEM," filed on May 8, 2009. The present application is also related to U.S. Provisional Patent Application Ser. No. 61/498,984 (hereafter the "984 Application"), entitled "AMPLITUDE ADJUSTED PULSE FOR DC BALANCED SIGNAL WITH TRANSFORMER COUPLING," filed on Jun. 20, 2011. The present application hereby claims the benefit of priority of the '517 application, the '800 application, and the '984 application. The '517 Application, '800 Application, and '984 Application are hereby incorporated herein by reference.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

High voltage systems often require communication schemes that offer both voltage isolation and robust performance in the presence of electromagnetic interference (EMI) and power transients. Such schemes are further improved through limiting EMI emissions. Embodiments described herein provide transmission systems and schemes that have high transient and EMI immunity with low EMI emissions.

Figure 1A:
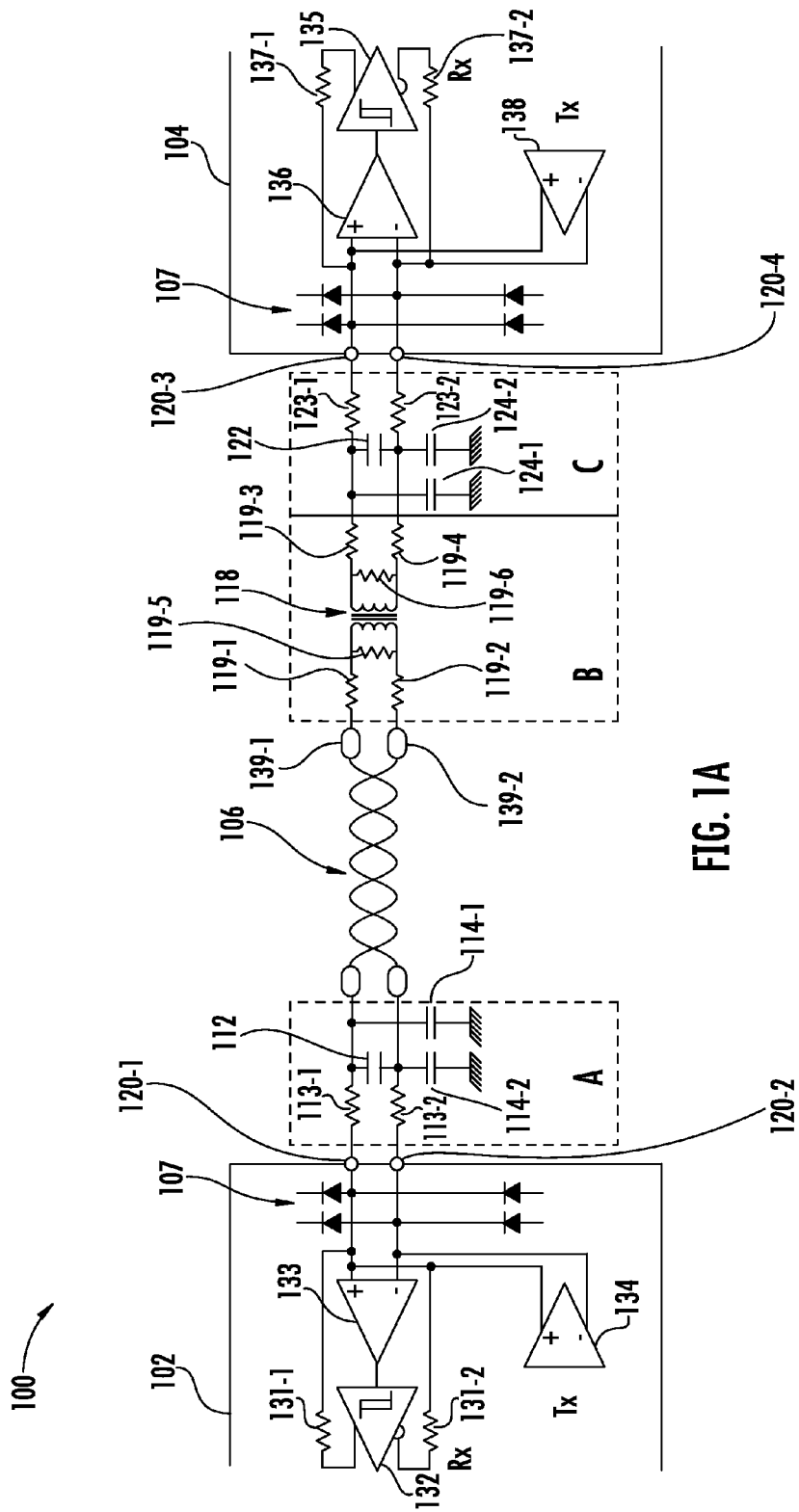
FIG. 1A is a schematic diagram of one embodiment of a communication system.

FIG. 1A is schematic diagram of one embodiment of a communication system 100 with capacitive coupling. The communication system 100 comprises a first transceiver 102 coupled to a second transceiver 104 via a communication medium 106. The communication medium 106 functions as a transmission line between the first and second transceivers 102 and 104. Embodiments of the communication medium 106 include a wired link such as a cable (for example, a flexible flat cable), circuit board trace, twisted pair or other communication medium. Communication between first and second transceivers 102 and 104 is bi-directional over the shared communication medium 106. The connection of the communication medium 106 to the first and second transceivers 102 and 104 can be achieved with any suitable connection now known or later developed.

The first transceiver 102 has a receiving functionality comprising communication pin input clamps 107, a trigger driver 133 coupled to the input of a differential driver 132, wherein two feedback resistors 131-1 and 131-2 are coupled to outputs of the differential driver 132. The first transceiver 102 also comprises a transmit driver 134. Symmetrically, the second transceiver 104 has a receiving functionality comprising a trigger driver 136 coupled to the input of a differential driver 135, wherein two feedback resistors 137-1 and 137-2 are coupled to outputs of the differential driver 135, and a transmitting functionality comprising transmit driver 138. The resistors described herein can be any suitable resistive element.

Communication system 100 is further discussed herein with respect to blocks A, B, and C. Each block includes a circuit configured to perform one or more functions. As will be described, blocks A and C provide termination load for block B, which reacts to provide voltage division and isolation. Blocks A and C can provide a low impedance load condition which allows the transmission of the signal while diminishing EMI effects. In an example, the first transceiver 102 includes a first port 120-1 and a second port 120-2 for communicating with the second transceiver 104 having a third port 120-3 and a fourth port 120-4. The first and second transceivers 102 and 104 can be coupled together over two paths referred to as high path 139-1 and low path 139-2. High path 139-1 can include the signal path from port 120-1 of the first transceiver 102 through block A, one or more first wires of the communication medium 106, blocks B and C, to port 120-3 of the second transceiver 104. Low path 139-2 can include the signal path from port 120-2 of the first transceiver 102 through block A, one or more first wires of the communication medium 106, blocks B and C, to port 120-4 of the second transceiver 104. In an example, transceivers 102, 104 can transmit a differential signal over high path 139-1 and low path 139-2.

Shown generally at block A, the first transceiver 102 can be coupled to the communication medium 106 via resistors 113-1 and 113-2, and capacitors 114-1 and 114-2 for paths 139-1 and 139-2, respectively. The capacitors 114-1 and 114-2 are each connected to ground. A differential capacitor 112 can be placed across the paths 139-1 and 139-2 between the resistors 113-1 and 113-2 and the communication medium 106. In one embodiment, transceiver 102 and block A are co-located on a single chip. In one embodiment, one or both of the transceivers 102 and 104 are quadrature amplitude modulation (QAM) transceivers.

The differential capacitor 112 can be coupled between paths 139-1 and 139-2 to provide a differential capacitive termination load and can reduce the tolerance effects of capacitors 114-1 and 114-2. Capacitors 114-1 and 114-2 are differential termination capacitors that can provide protection against transients by forming discharge paths to ground. When the communication system 100 is exposed to EMI with a frequency higher than the data communication rate, the low impedance on the paths 139-1 and 139-2 from the presence of the differential capacitor 112 can diminish the effect of the EMI at the receiver side. Furthermore, the low impedance and high frequency at the receiver can work together to reject the EMI. The differential capacitor 112 can reduce the tolerance effects of the ground connected capacitors 114-1 and 114-2.

Shown generally at block C (symmetric with block A), the second transceiver 104 can be coupled to the communication medium 106 via resistors 123-1 and 123-2 and capacitors 124-1 and 124-2 for paths 139-1 and 139-2, respectively. The capacitors 124-1 and 124-2 can be connected to ground. A differential capacitor 122 can be coupled between paths 139-1 and 139-2 and positioned between the resistors 123-1 and 123-2 and the resistors 119-1 and 119-2. The capacitors in block C operate in the manner similar to the capacitors in block A.

Shown generally at isolation block B, the second transceiver 104 can be coupled to the communication medium 106 through a transformer 118. The transformer 118 can provide voltage isolation for the second transceiver 104. In some examples, a resistor circuit can be used to translate a current source to a voltage signal and as a voltage divider to provide signal attenuation. For example, the resistor divider circuit can be used to define and attenuate a signal at the second transceiver 104. This voltage dividing can be used to scale the voltage at the receiver to allow compatibility with the receiver characteristic. The resistors in blocks A and C also enhance the level of protection against transient events by limiting the current of signals through the communication medium 106.

In an example, the resistor divider circuit can include a series resistor on each side of the transformer 118 for each communication path 139-1, 139-2. In the example shown in FIG. 1A, therefore, a first resistor 119-1 can be coupled in series between the high path 139-1 and the transformer 118. A second resistor 119-2 can be coupled in series between the path 139-2 and the transformer 118. A third resistor 119-3 can be coupled in series between the third port 120-3 of the second transceiver 104 and the transformer 118. A fourth resistor 119-4 can be coupled between the fourth port 120-4 of the second transceiver 104 and the transformer 118.

The resistor divider circuit can also include a resistor coupled between the communication paths 139-1, 139-2 on both sides of the transformer 118. In the example shown in FIG. 1A, therefore, a fifth resistor 119-5 is coupled between the high path 139-1 and the low path 139-2. This fifth resistor 119-5 is coupled in the circuit between the communication medium 106 and transformer 118. A sixth resistor 119-6 can also be coupled between the high path 139-1 and the low path 139-2. This sixth resistor, however, can be coupled in the circuit between the transformer 118 and the third and fourth ports 120-3, 120-4 of the second transceiver 104. The resistors 119-1, 119-2, 119-3, 119-4, 119-5, and 119-6 can function to provide the voltage division for signal attenuation as discussed above. In one embodiment, transceiver 104 and blocks B and C are located together on a single chip.

Figure 1B:
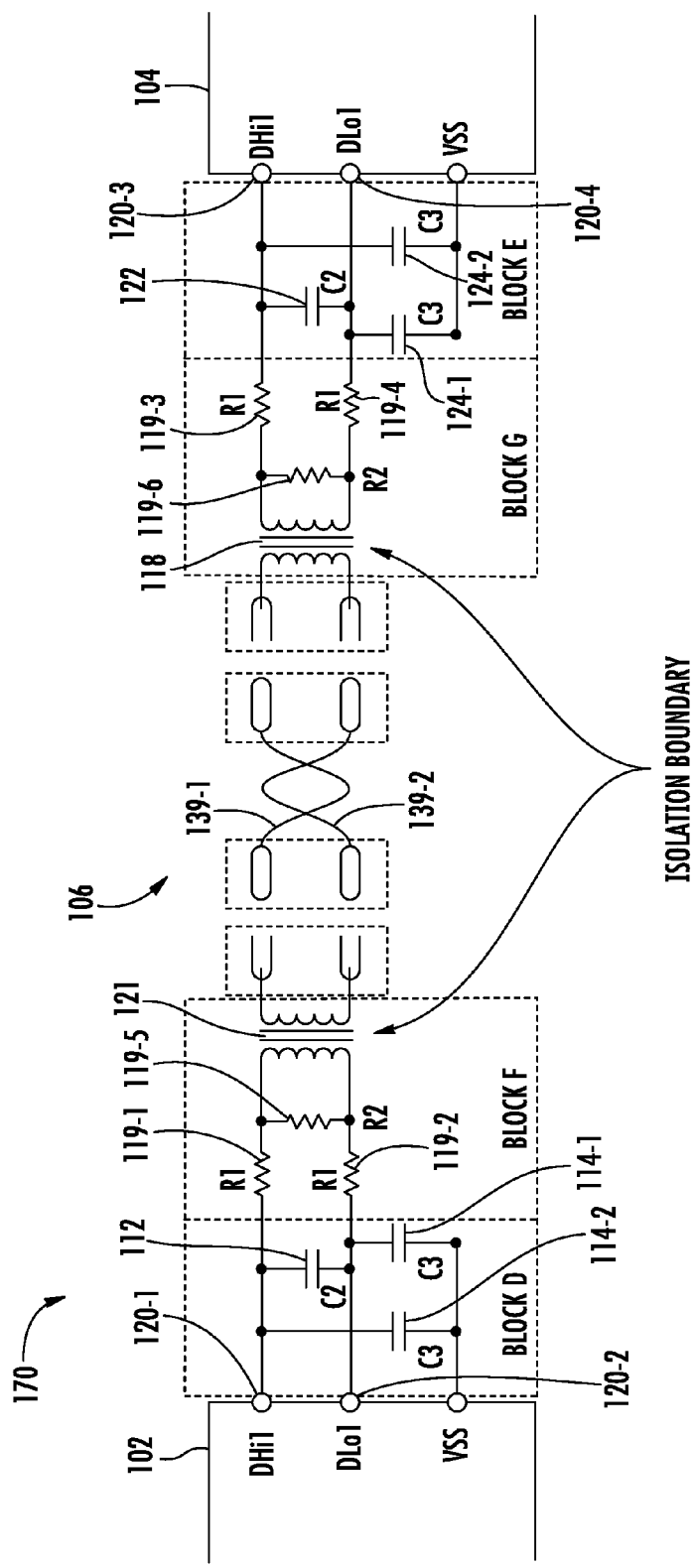
FIG. 1B is a schematic diagram of another embodiment of a communication system.

FIG. 1B is a schematic diagram of another embodiment of a communication system 170 with transformer coupling. The communication system 170 can include many components similar to the communication system 100 discussed with respect to FIG. 1A. Similar components have been numbered the same. The communication system 170 can include a first transceiver 102 and a second transceiver 104 communicatively coupled together with a communication medium 106. The communication system 170 can also include a plurality of blocks D, E, F, G coupled between the transceivers 102, 104. Each block D, E, F, and G includes a circuit configured to perform one or more functions.

Blocks D and E can provide a low impedance load condition which allows the transmission of a signal while diminishing EMI effects. Blocks D and E in system 170 can be similar to blocks A and C described with respect to FIG. 1A, except blocks D and E do not include the optional series resistors 113-1, 113-2, and 123-1, 123-2 of FIG. 1A. Capacitors 112, 114-1, 114-2, 122, 124-1, and 124-2, however, function in a manner similar to that described with respect to blocks A and C in FIG. 1A.

Communication system 170 can include one or more isolation blocks F and G, to provide isolation for transceivers 102, 104. An isolation block F can be located between the termination block D and the communication medium 106. The isolation block F can include a transformer 121 coupled between the first and second port 120-1, 120-2 and the communication medium 106 to provide voltage isolation (e.g., an isolation boundary) for the first transceiver 102. The resistors 119-1, 119-2, and 119-5 can be located between the first and second ports 120-1, 120-2 of the first transceiver 102 and the transformer 121 of the isolation block F. In this location, the resistors 119-1, 119-2, and 119-5 can be coupled in the communication paths 139-1, 139-2 in the same manner as described in circuit 100 with respect to block C. Thus, the first resistor 119-1 can be coupled in series between the first port 120-1 of the transceiver 102 and the transformer 121 of the isolation block F. The second resistor 119-2 can be coupled in series between the second port 120-2 of the transceiver 102 and the transformer 121 of the isolation block F. The fifth resistor 119-5 can be coupled between the high path 139-1 and the low path 139-2. In this example, the fifth resistor 119-5 can be coupled in the circuit between the first and second ports 120-1, 120-2 of the transceiver 102 and the transformer 121 of the isolation block F. Accordingly, the isolation block F can provide a similar function to the isolation block B of FIG. 1A.

In some examples, an isolation block can be included on each end of the communication medium 106 in order to provide protection for a user that may come into contact with the communication medium 106 while the communication medium 106 is disconnected from one of the transceivers 102, 104. This may occur, for example, during installation or maintenance of the communication system 100. FIG. 1B illustrates such a circuit including two isolation blocks F and G, one at each transceiver 102, 104. As shown, isolation block G can be a mirror image of isolation block F. Accordingly, the isolation block G can include a transformer 118 coupled between the third and fourth port 120-3, 120-4 and the communication medium 106 to provide voltage isolation (e.g., an isolation boundary) for the second transceiver 104. Isolation block G can include resisters 119-3, 119-4, and 119-6 which can be located between the third and fourth ports 120-3, 120-4 of the second transceiver 104 and a transformer 118 of the isolation block G. The resistors 119-3, 119-4, and 119-6 can be coupled in the communication paths 139-1, 139-2 in the same manner as described in circuit 100 with respect to block C. Thus, the resistor 119-3 can be coupled in series between the third port 120-3 of the transceiver 104 and the transformer 118 of the isolation block G. The resistor 119-4 can be coupled in series between the fourth port 120-4 of the transceiver 104 and the transformer 118 of the isolation block G. The resistor 119-6 can be coupled between the high path 139-1 and the low path 139-2. In this example, the resistor 119-6 can be coupled in the circuit between the third and fourth ports 120-3, 120-4 of the transceiver 104 and the transformer 118 of the isolation block G. Accordingly, the isolation block G can provide a similar function to the isolation block F.

The functionality of the communication systems 100, 170 are described below in terms of unidirectional communication, however, it should be understood that the systems 100 and 170 can provide bi-directional communication. The first transceiver 102 (acting as the transmitter) can transmit a signal to the second transceiver 104 (acting as the receiver). While the first transceiver 102 is transmitting, the capacitors and resistors in blocks A and D respectively can control the edge rate of the signal (that is, the rise time of the signal). In one embodiment, the transmitted signal can be modified by switched current sources, described below in FIG. 4, in the transceiver 102 such that the capacitors 112, 114-1, and 114-2 receive a ramp signal. The frequency of the EMI emissions from this signal is determined by the rise time of the ramp, wherein raising the frequency of the transmitting signal increases the power of the EMI. Consequently, the power in the communication systems 100 and 170 can be determined by the frequency of the edges. As the rise time of the signal transmitted by the transceiver 102 is reduced, the frequency of the signal transmitted over communication medium 106 is also reduced. Potential EMI can be reduced due to the split differential architecture of the communication systems 100, 170 and the coupling of the transceiver 102 to the communication medium 106. Blocks C and E respectively can affect a transmitted signal from the second transceiver 104 in a manner similar to how blocks A and D affect transmitted signals from the first transmitter 102.

The optional resistors 113-1 and 113-2, shown in FIG. 1A, can improve the rejection of very high frequency (VHF) EMI along with the pin input capacitance of the transceivers 102 and 104. Some embodiments of the communication system 100 comprising a current source derived transmission scheme may not include resistors 113-1 and 113-2.

An example of values of the components in blocks A, B, C, D, E, and F are described herein to illustrate signal levels commensurate with a particular current source value relationship. It is noted that this example is merely illustrative, and the capacitances, resistances, and inductances can be of any suitable value.

TABLE I

| Component | Example values |
| --- | --- |
| Capacitors 114-1, 114-2, 124-1, and 124-2 | 100 pF |
| Differential Capacitors 112 and 122 | 220 pF |
| Resistors 113-1, 113-2, 123-1, and 123-2 | 100 Ω |
| Transformer(s) 118, 121 | 4.7 mH |
| Resistors 119-1, 119-2, 119-3, 119-4 | 1 kΩ |
| Resistors 119-5, 119-6 | 1 kΩ |

Figure 1C:
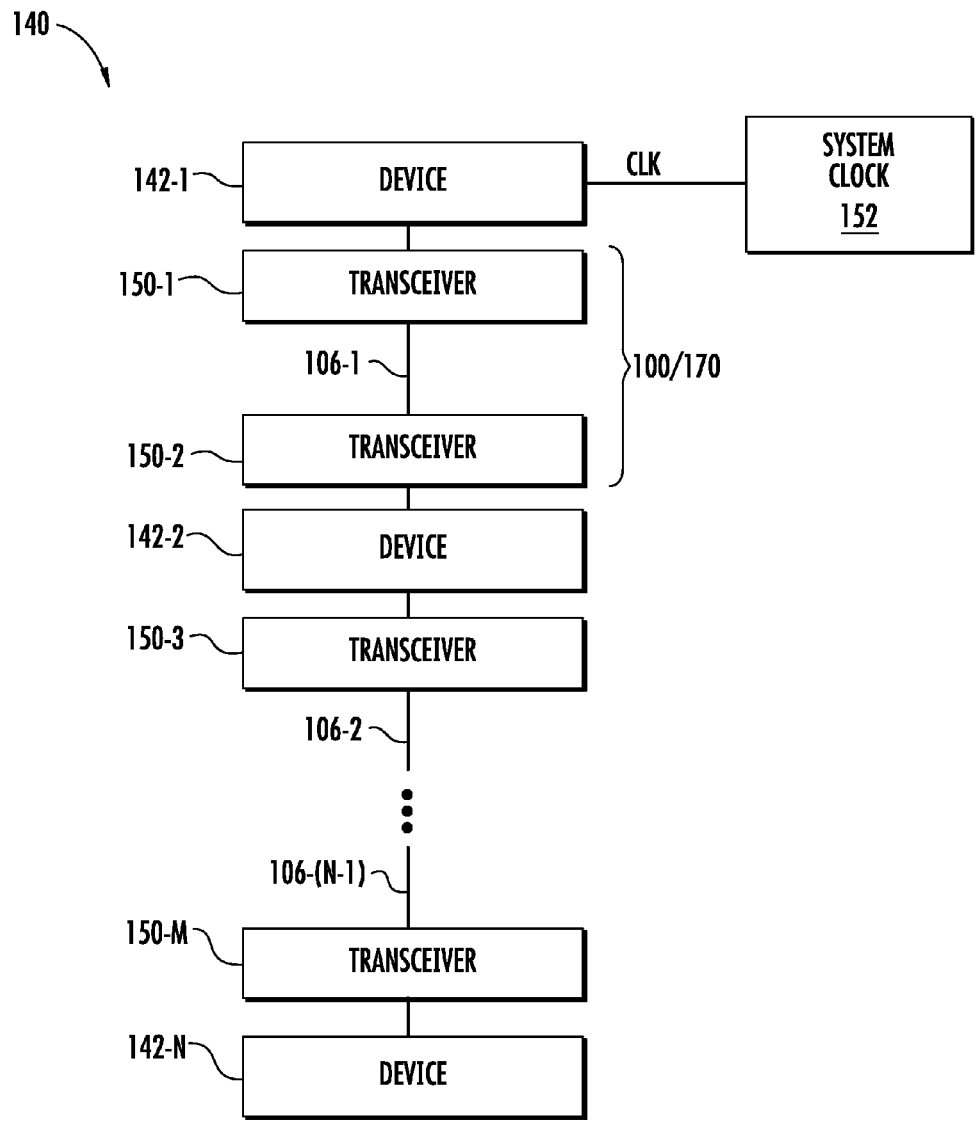
FIG. 1C is a block diagram of one embodiment of a system utilizing the communication system of FIG. 1A and/or FIG. 1B.

FIG. 1C is a block diagram of one embodiment of a daisy chain system 140 utilizing the communication system 100 of FIG. 1A, the communication system 170 of FIG. 1B, or both. System 140 comprises N devices 142-1 through 142-N communicatively coupled together in a daisy chain manner using a plurality of communication systems 100, 170. Device 142-1 is communicatively coupled to a first transceiver 150-1 which is coupled to communication medium 106-1 coupled to a second transceiver 150-2 coupled in turn to device 142-2. The first transceiver 150-1, communication medium 106-1, and second transceiver 150-2 make up a communication system 100 or communication system 170 and are therefore coupled together as shown in Figures 1A or 1B. The second device 142-2 can then provide clock and data signals to a third transceiver 150-3 for transmission to one or more devices 142-N down the daisy chain. The third transceiver 150-3 is coupled to communication medium 106-2. Further devices 142-N can receive signals from devices up the daisy chain via transceiver 150-M which is coupled to communication medium 106-(N-1). In this manner, transceivers 150-M link device 142-N to the daisy chain system 140 with communication medium 106-(N-1). Each transceiver 150-1 to 150-N can have at least two transmit/receive ports (e.g., 120-1, 120-2). Moreover, circuits corresponding to Blocks A-G of Figures 1A and 1B can be included between respective transceivers 150-1 to 150-N.

In one embodiment, the daisy chain system 140 functions as follows. The timing of the daisy chain system 140 is controlled by a system clock 152. The device 142-1 provides a clock (CLK) signal from the system clock 152 and a data signal to the transceiver 150-1. The transceiver 150-1 can combine the data signal and the clock signal to form a hybrid encoded data signal (also referred to herein as the daisy chain signal). The hybrid encoded data signal is an amplitude modulated square wave signal and can be, for example, formed according to a Manchester encoding scheme discussed below. This hybrid encoded data signal can be transmitted over communication medium 106-1 to transceiver 150-2. Operating in receive mode, transceiver 150-2 can receive the hybrid encoded data signal, decode the signal to extract the data and the clock signal. The transceiver 150-2 can then provide the data and clock signal to the device 142-2.

This process can be similarly repeated throughout the daisy chain system 140. For example, after the data and clock signal is provided to the device 142-2, the device 142-2 can provide the clock signal and its own data signal to the transceiver 150-3 for communication to devices 142-N down the daisy chain. The transceiver 150-3 can be coupled to the communication medium 106-2 and the transceiver 150-3 can combine the data signal from the device 142-2 and the extracted clock signal from the transceiver 150-2 to form a second hybrid encoded data signal. This second hybrid encoded data signal can be transmitted to transceivers 150-M down the daisy chain. Transceiver 150-M can receive a hybrid encoded data signal, and decode the signal to extract the data and the clock signal. The transceiver 150-M can then provide the data and clock signal to the device 142-N. Accordingly, the daisy chained transceivers 150-2 through 150-N can provide the extracted clock signal from the system clock 152 to the devices 142-2 through 142-N.

In this manner, one or more communication systems 100, 170 can be linked together in a daisy chain manner as shown in FIG. 1C. The daisy chain signal can provide data such as, for example, register contents, device commands and reading or writing register contents from one device 142-1, 142-2, 142-3, 142-N to another.

In one embodiment, a transceiver 150-1 can be packaged onto a single chip which can be mounted on a board along with appropriate circuits corresponding to Blocks A-G. The board can then be connected to a device, such as device 142-1. In one embodiment, the daisy chain system 140 can be used to couple the plurality of devices 142-1, 142-2, 142-N to a plurality of battery cells in a daisy chain fashion. The daisy chain system 142 can be a module that goes into a battery pack. In one embodiment, the battery cells are Lithium ion (Li-ion) battery cells. In another embodiment, 12 Li-ion battery cells are connected by communication systems 100, 170 to make a robust module protected from many transient events and EMI.

Figure 2A:
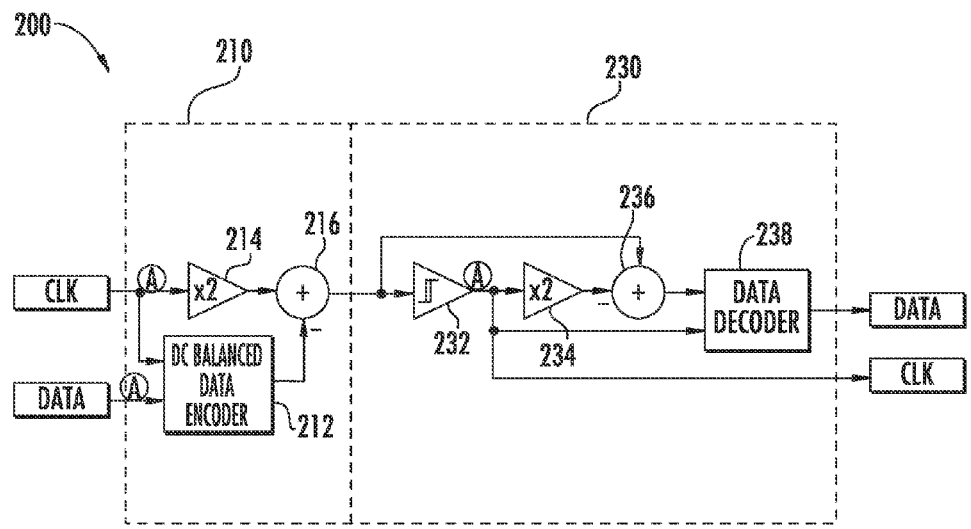
FIGS. 2A and 2B are block diagrams of alternative embodiments of a transceiver for use in the systems of FIG. 1A, 1B, or 1C.

FIG. 2A is a block diagram of one embodiment of a transceiver 200 comprising a transmitter 210 and receiver 230. The transmitter 210 comprises a DC balanced data encoder 212, a multiplier 214, and a summer 216. The transmitter 210 receives a data signal from a device and a clock signal, encodes the data, combines the encoded data with an amplified clock signal, and transmits the data, for example, over communications medium 106. The receiver 230 receives a hybrid encoded data signal, for example, over communications medium 106, decodes the data signal and extracts a clock signal.

One embodiment of the DC balanced data encoder 212 employs Manchester encoding; however, the DC balanced data encoder 212 may utilize any other encoding scheme that DC balances data. Manchester encoding is a basic encoding scheme that provides two clock cycles for every bit of data, for a 50% efficiency level. In other words, every two edges of a Manchester encoded data stream results in one bit of data.

The data (DATA) and clock (CLK) signals, which have similar amplitudes in one embodiment, are encoded in DC balanced data encoder 212. The CLK and DATA signals are combined into a timing encoded signal that is based on an amplitude modulated Manchester encoding scheme. Thus, the clock signal can be easily recovered from the Manchester encoded data without requiring a phase locked loop (PLL) as the CLK signal is embedded in the timing encoded signal. Furthermore, because a PLL is not necessary, a training sequence used to trigger the PLL does not have to be added to the output of the DC balanced data encoder 212. Therefore, every bit of the DATA signal is recoverable without delay because the timing encoded signal does not have to be locked to a clock.

The amplitude of the clock signal is multiplied by a factor, for example, 2, using multiplier 214. Summer 216 sums the timing encoded signal and the multiplied CLK signal (the outputs of DC balanced data encoder 212 and multiplier 214, respectively) and generates a summed output that is transmitted to receiver 230.

Receiver 230 comprises a zero crossing detector 232 and a summer 236, both coupled directly to the transmitter 210, a multiplier 234, and a data decoder 238. Zero crossing detector 232 receives the transmitted encoded signal and recovers the CLK signal at its output terminal. The output of zero crossing detector 232 is multiplied by multiplier 234 and supplied to a first input terminal of summer 236. Summer 236 receives the transmitted signal at its second input terminal. Data decoder 238 receives the output of summer 236 and the clock signal recovered by zero-crossing detector 232 to recover the data. The signals shown at points A have similar amplitudes.

Figure 2B:
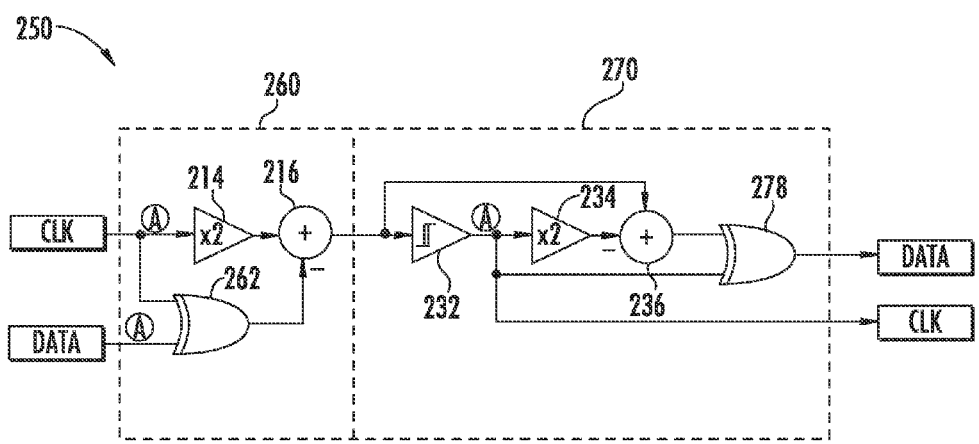
Figure 4:
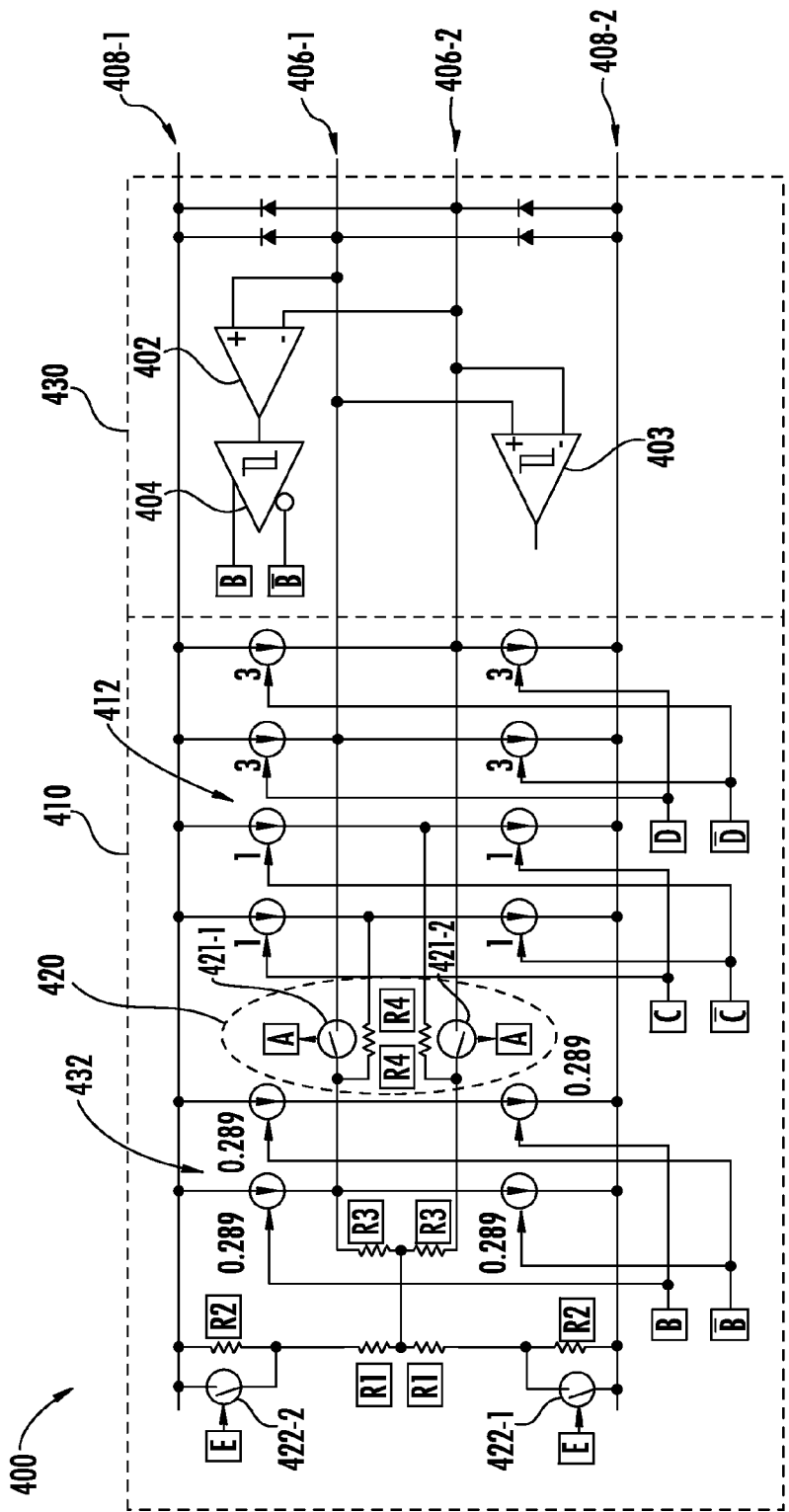
FIG. 4 is a schematic diagram of one embodiment of a transceiver for use in the systems of FIG. 1A, 1B, or 1C.
Figure 5:
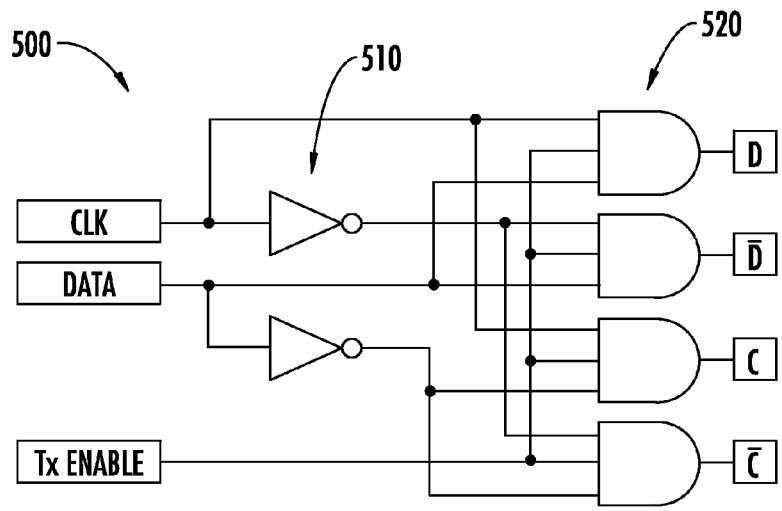
FIG. 5 is a schematic diagram of one embodiment of an encoder for use in with the transceiver of FIG. 4.

FIG. 2B is a block diagram of one embodiment of a transceiver 250 comprising a transmitter 260 and receiver 270. Transmitter 260 is similar to transmitter 210 except that transmitter 260 uses an XOR gate 262 in place of DC-balanced and data encoder 212. Likewise, receiver 270 is similar to receiver 230 except that receiver 270 uses an XOR gate 278 in place of data decoder 238. The encoded signal is generated by mixing the Manchester encoded signal (generated by XOR gate 262) with the clock signal to provide a hybrid encoded signal. The hybrid encoded signal is an amplitude modulated signal with a zero crossing at each clock edge. The hybrid encoded signal maintains full integrity of the data signal. The signals are produced using simple logic and a voltage summing node or using switched current sources as shown in FIGS. 4 and 5 below. A 2:1 relationship is used in FIGS. 2A and 2B for illustrative purposes, but any ratio can be implemented. generated by mixing the Manchester encoded signal (generated by XOR gate 262) with the clock signal to provide a hybrid encoded signal. The hybrid encoded signal is an amplitude modulated signal with a zero crossing at each clock edge. The hybrid encoded signal maintains full integrity of the data signal. The signals are produced using simple logic and a voltage summing node or using switched current sources as shown in FIGS. 4 and 5 below. A 2:1 relationship is used in FIGS. 2A and 2B for illustrative purposes, but any ratio can be implemented.

Figure 3A:
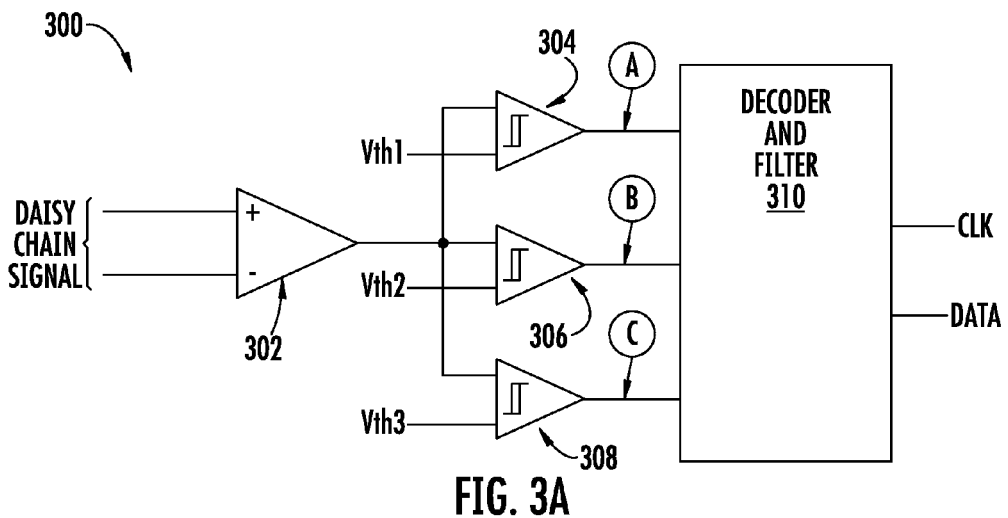
FIG. 3A is a block diagram of one embodiment of a receiver for use in the systems of FIG. 1A, 1B, or 1C.

FIG. 3A is a block diagram of one embodiment of a receiver 300 that receives a differential daisy chain signal at its inputs and can recover a clock signal and a data signal from the differential daisy chain signal. The receiver 300 comprises a differential receiver 302. The differential receiver 302 converts the differential daisy chain signal into a single ended signal that is fed into a first input of comparators 304, 306, and 308. Thresholds Vth1, Vth2, and Vth3 are inputted to the second input of comparators 304, 306, and 308, respectively, and define the signal levels for the various daisy chain states. The outputs of comparators 304, 306, and 308 are inputted to a decoder and filter 310 that decodes the inputted signals into the CLK and DATA signals. The zero-crossing defines the CLK signal, where the positive and negative voltage swings are associated with the '0' and '1' states of the daisy chain signal. That is, each zero crossing detected by the comparator 306 is translated into an edge of the clock signal. Moreover, pulses (e.g., the positive and negative voltage swings) are translated by comparator 304 and 306 into digital values of the data signal.

Figure 3B:
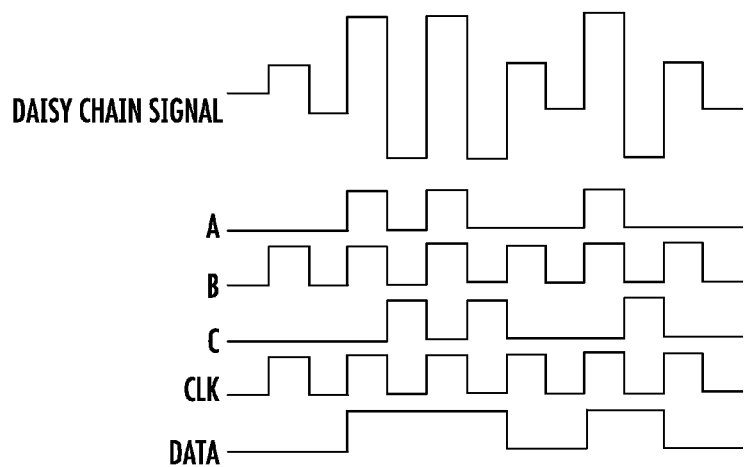
FIG. 3B is an exemplary timing diagram corresponding to the receiver of FIG. 3A.

FIG. 3B is a timing diagram corresponding to the receiver 300 of FIG. 3A. The daisy chain signal is the differential input signal to differential receiver 302. The signals A, B, and C correspond to the outputs of comparators 304, 306, and 308, respectively. In this example, comparator 306 compares the differential daisy chain signal and threshold Vth2. Threshold Vth2 has a voltage of zero or a nominal voltage. Therefore, comparator 306 detects zero crossings and directly recovers the clock signal B. The thresholds Vth1 and Vth3 are set to detect high level transitions of the daisy chain signal. Threshold Vth1 is set to detect high amplitude pulses and ignore low amplitude pulses. Comparator 304 outputs signal A to which has a pulse for every high amplitude pulse using threshold Vth1. Similarly, threshold Vth3 is set to detect low amplitude pulses only, wherein comparator 308 outputs signal C with a pulse for every low amplitude pulse on the daisy chain signal. The decoder and filter 310 resolves the signals A, B, and C into the CLK and DATA signals. In one embodiment, the decoder and filter 310 comprises a clock filter, a data filter, and a data retiming function, as described in more detail below in FIG. 7.

Figure 3C:
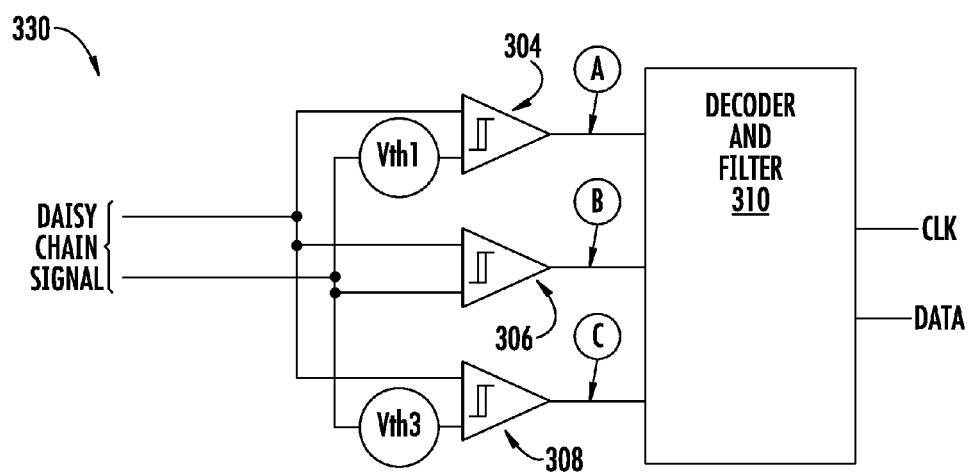
FIG. 3C is a block diagram of an alternate embodiment of a receiver for use in the systems of FIG. 1A, 1B, or 1C.

FIG. 3C is a block diagram of an alternate embodiment of a receiver 330. Like receiver 300, receiver 330 comprises comparators 304, 306, and 308 and decoder and filter 310. However, receiver 330 does not have a differential receiver 302 like in receiver 300. Instead, a first daisy chain signal is directly provided to a first input of the comparators 304, 306, and 308. The second daisy chain signal (the inverse of the first daisy chain signal) provided to a second input of the comparator 304 modified by threshold Vth1, directly to a second input of comparator 306, and to a second input of comparator 308 modified by threshold Vth3.

FIG. 4 is a schematic diagram of one embodiment of a transceiver 400 which is constructed using current sources. Alternate constructions based on voltage sources are also possible. The transceiver 400 comprises a transmitter shown generally at 410 and a receiver shown generally at 430. The transceiver 400 receives control signals at inputs A, B, C, D, E, and F and their corresponding inverted signals, B-bar, C-bar, and D-bar. Lines 406-1 and 406-2 are differential lines go out to pins (for example, on an external device in some embodiments) that connect to a communication medium (for example, communication medium 106). Lines 408-1 and 408-2 supply power to the transceiver 400. The transceiver 400 operates in four modes, normal mode, receive mode, transmit mode, and sleep mode, described below.

Transceiver 400 further comprises a receive amplifier 402, a zero-crossing detector 404, and a sleep mode receiver 403. The transceiver further comprises a switch circuit shown generally at 420. FIG. 4 also illustrates a multitude of switched current sources that combine the clock and Manchester encoded data into a hybrid encoded signal. The transmitter 410 comprises a plurality of transmit current sources 412 shown as 1× unit and 3× unit sources, while the receiver 430 controls a plurality of receive current sources 432 shown as 0.289× units. These ratios produce specific waveforms during transmission and receipt, and accommodate specific external circuit values. However, it is understood that other values are used in other implementations.

During normal mode, there is no activity on the daisy chain and both receiver ports of every transceiver 400 in the daisy chain system are primed to receive a signal. In normal mode, the transceiver 400 waits to detect a daisy chain signal arriving at lines 406-1 and 406-2 connected to the two receiver ports. In normal mode, the receive amplifier 402 and the zero-crossing detector 404 that drives the current sources 432 are active. The receive amplifier 402 is active while the receiver 430 is in normal mode and translates the input waveform voltage levels and timing for subsequent decoding. The zero crossing detector 404 generates the receive servo signals B and B-bar. Receive servo signal B and B-bar control current sources 432 and are active during normal mode and receive mode.

During receive mode, the transceiver 400 detects an incoming transmission at a receive port from the daisy chain. The transceiver 400 relays the information coming in on a receive port to a transmit port to be transmitted to the next transceiver along the daisy chain. Every component that was active during normal mode is also active during receive mode. The bypass switches 421-1 and 421-2 have low open capacitances so as not to load the input waveform with receive servo signals produced by B and B-bar and current sources 432. The receive servo current sources 432 are adjusted for any change in R3. Signals B and B-bar maintain a bus idle condition and promote correct DC values when the transceiver 400 is in receive mode. In normal or receive mode, current sources C, C-bar, D, and D-bar are off because they are transmit functions. Switches A are open in receive mode so the path from the input to the receive servo current sources 432, goes through resistors R4.

The signals C and C-bar are 1× unit current source switch drive signals that control the 1× unit transmit current sources 412, which are disabled during receive mode. The signals D and D-bar are 3× unit current source switch drive signals control the 3× unit transmit current sources 412, which are also disabled during receive mode. As described below, FIG. 5 is an exemplary encoder that drives the signals C, C-bar, D, and D-bar.

In transmit mode, the transceiver 400 transmits an encoded signal along the daisy chain. Signals B and B-bar are disabled when the transceiver 400 is in transmit mode and control signals C, C-bar, D, and D-bar are turned on. The switches A close so resistors R4 are bypassed, resulting in a low impedance path back to resistors R3. The output level is set by the value of R3 and the value of the current through R3, which is caused by the current sources 412 with C, C-bar, D, and D-bar. The receiver 430 is disabled during transmit mode.

Sleep mode puts the transceiver 400 into a low current state where receive amplifier 402 and zero crossing detector 404 are powered down while the sleep mode receiver 403 is powered up. The control signals B, B-bar, C, C-bar, D, and D-bar are off in sleep mode. During sleep mode switches E are open. In one embodiment, resistors R2 have a high value resistance compared with the resistance of resistors R1. In contrast with normal mode, where switches E are closed and resistors R2 are bypassed, in sleep mode current flows through resistors R2 and R1. In one embodiment, there is a buffer between a connection of the centers of resistors R1 and R3.

The sleep mode receiver 403 wakes the transceiver 400 from sleep mode when it detects a zero crossing over the paths 406-1 or 406-2. In one embodiment, sleep mode receiver 403 processes a 4 kHz input clock signal and operates at a relatively low power. Once a wakeup condition is identified, a sleep mode receiver optionally shuts down and the transmit mode receiver 402 is activated. The transmitter 410 is also activated and is used to relay the wakeup signal to the next linked device in embodiments where the transceiver 400 is part of a daisy chain.

The transmit mode receiver 402 also feeds zero crossing detector 404 which provides communication idle condition servo signals during receive mode. This function may be used to maintain compatibility with a variety of transmission circuits and, in some examples, is not used for the embodiments shown in FIGS. 1A and 1B. The communication idle condition results from the clock and data signals both being at a predetermined logic level. In one embodiment, all transmissions begin with the bus in the idle condition, and the bus always reverts to the idle condition following a transmission. The receiver 430 is forced to the bus idle condition (if not already in this condition) following a communication timeout as part of an error recovery system. In some embodiments, depending on the location of filtering used for high frequency (HF) noise rejection, the zero crossing detector 404 used for the servo function is the same detector used for clock recovery. In other embodiments, the zero crossing detector 404 does not perform clock recovery.

The transceiver 400 further comprises a switching circuit shown generally at 420 that provides a switch over signal that toggles the transceiver 400 between transmit and receive modes. The switching circuit 420 comprises bypass resistors R4 and bypass switches 421-1 and 421-2 that receive signals provided at A. The signal A drives the switching circuit 420, which bypasses the resistors R4 while the transceiver 400 is in transmit mode. Resistors R4 isolate drive impedance from external circuit impedance while the transceiver 400 is receiving. An exemplary value of resistors R4 is 10 kΩ, assuming ideal switches; however any suitable resistance value may be used. The on-resistance of bypass switches 421-1 and 421-2 is taken into account when sizing source resistors R3. Resistors R3 interact with the current sources for both transmitter 410 and receiver 430 and provides transmitter source impedance and drive level settings for the transmit signal level. Exemplary values of R3 include 200Ω, with 150Ω and 100Ω, or any other suitable resistance value.

Signal E drives switches 422-1 and 422-2 that bypass sleep mode bias resistors R2 to allow higher bias current in transmit mode. Resistors R2 provide bias generation during sleep mode. Resistors R1 generate a bias voltage during transmit mode. In another embodiment, additional switches are used to isolate the bias networks in shutdown mode.

The unit current source values are programmable, for example, with non-volatile memory or masks. In one example, currents of 2.5 mA and 4 mA are used with the exemplary resistance R1-R4 values discussed above and using the external circuit of, for example, FIG. 9 described below, with the external circuit component values shown in Table I above. Exemplary selected current source values are 2.5 mA, 4 mA, and 6.5 mA, but can be any suitable current. In this embodiment, the theoretical average current drawn while the transceiver 400 is transmitting is then nearly twice the unit current value.

In an alternate embodiment of FIG. 4, the current sources are reconfigured such that the transmitter current sources 412 are located on the left of switching circuit 420 and receiver current sources 432 are on the right of switch circuit 420. This provides improvements in current consumption and signal level accuracy.

FIG. 5 is a schematic diagram of one embodiment of an encoder 500. In this embodiment, the encoder 500 is a transmitter encoding circuit that receives a CLK, DATA, and transmit enable (Tx enable) signals and outputs intermediate signals C, C-bar, D, and D-bar. The transmitter encoding circuit 500 comprises two inverters 510 and four AND gates 520. The D, D-bar, C, and C-bar drive signals are used to correctly encode the data stream to into the encoded hybrid signal.

In one embodiment, transmit encoding circuit 500 is coupled to the transmitter 410 of FIG. 4 at C, C-bar, D, and D-bar. In one embodiment, the transmitter encoding circuit 500 provides an additional edge boost function that reduces the rise time of the unit transitions, which aids in maintaining clock recovery timing. The system turns on the relevant 3× current source momentarily at the start of each 1× transition, amplifying the waveform and producing similar zero crossing timing for both 1× to 3× and 3× to 1× transitions.

Figure 6:
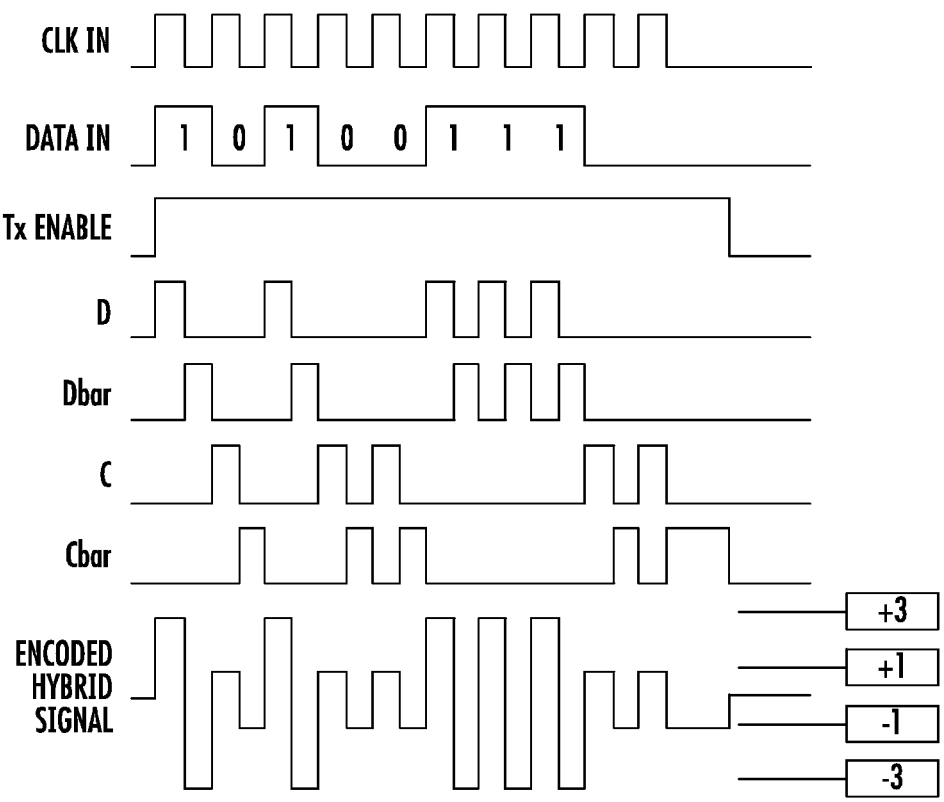
FIG. 6 is an exemplary timing diagram of signals in the circuits of FIGS. 4 and 5.

FIG. 6 is a timing diagram of one embodiment of signals in the circuits of FIGS. 4 and 5. In one embodiment, FIG. 6 achieves the same end result as is achieved in FIG. 2A, but shows the intermediate driver signals D, D-bar, C, and C-bar the transceiver 400 uses to produce the encoded hybrid signal output. The encoded hybrid signal is the final output of the transceiver 400 of FIG. 4 without showing intermediary steps, for example, the Manchester encoded data.

The CLK, DATA, and Tx enable signals are inputted to the transmit encoding circuit 500, which outputs D, D-bar, C, and C-bar to the transceiver 400. The transmit enable signal (Tx enable) enables the transmitter 410 and has a logic high when the transceiver 400 transmits. The transmitter 410 may transmit when the device to which the transceiver 400 is coupled to (for example, device 142-1) wants to send a message or when the receiver 430 receives a message on one daisy chain port for relay through the next daisy chain port.

As shown in FIG. 6, the encoded signal is amplitude modulated (with an amplitude of −3, −1, 1, and 3 referred to a suitable unit value) and has a zero crossing at each clock edge. Because there is a zero crossing at each clock edge, CLK is directly recoverable. That is, each zero crossing of the amplitude modulated signal received can be translated to an edge of a clock signal recovered therefrom.

Figure 7:
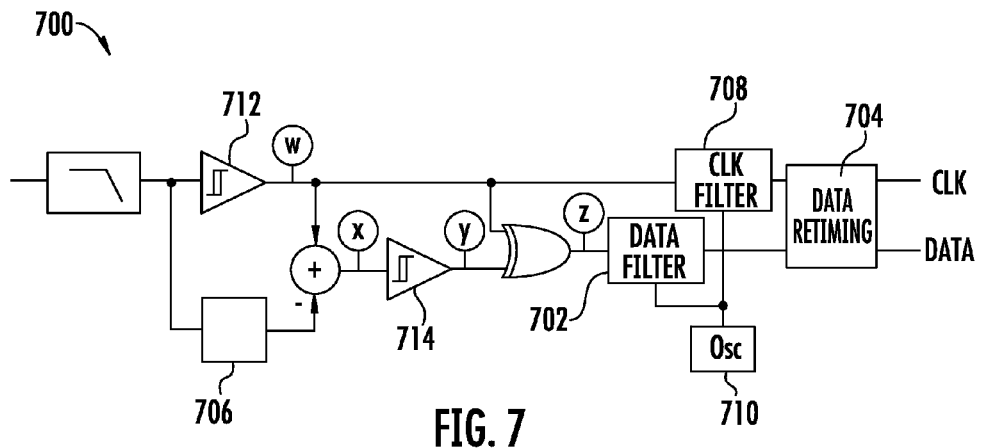
FIG. 7 is a schematic diagram of one embodiment of a receiver for use in the systems of FIG. 1A, 1B, or 1C.

FIG. 7 is a schematic diagram of one embodiment of a receiver 700. Receiver 700 performs clock recovery, signal reconstruction, filtering and data retiming on the receiver end (for example, the receiving portion of second transceiver 104 in the communication systems 100, 150). The decoder 700 comprises a data filter 702, a data retiming block 704, a gain circuit 706, a clock filter 708, an oscillator 710, and a zero crossing detector 712.

In one embodiment, the receiver 700 performs the reverse functions to decode the data that a transmitter did to encode the data. The amplitude modulated signal (e.g., the encoded signal) is provided at an input of the zero crossing detector 712, which recovers the clock (CLK) signal (w). The clock signal can be recovered by translating each zero crossing of the amplitude modulates signal into an edge of the clock signal.

The data signal can be recovered by translating voltage levels of the amplitude modulated signal into digital values of the data signal. In an example, the amplitude modulated signal (e.g., the encoded signal) is modified by gain 706, which is then subtracted from the recovered clock signal w to create noisy recovered data signal (x), an amplitude constrained signal. The signal x is a first stage decoded data signal and is provided to an input of a zero-crossing detector 714. Filtering is applied to this function to help reduce high frequency noise effects. The zero-crossing detector 714 outputs a lower noise version of signal x (y). The data filter 702 further reduces the noise of signal y using a counter-based filtering operation to recover the data signal (z).

Data retiming block 704 retimes the data signal z to be one clock cycle later. The delay of 1 clock cycle is provided to the data signal z between daisy chain receipt and relayed signal output to accommodate the filtering of data filter 702. The output of the receiver 700 enables the signal to be transmitted at the start of the second daisy chain clock cycle such that the first transmitted clock cycle contains the first data bit. For example, the transceiver 104 comprises the receiver 700 which decodes the received data and prepares it for transmission by the transmitter in transceiver 104. In one embodiment, the receiver 700 is part of a daisy chain network. Other methods of data signal recovery are possible, including the use of direct signal threshold detection of the single ended signal.

Figure 8:
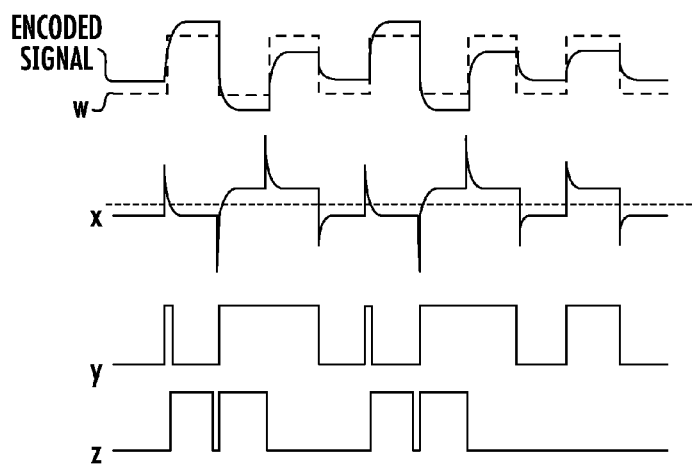
FIGS. 8 and 9 are exemplary timing diagrams corresponding to the receiver of FIG. 7.

FIG. 8 is an exemplary timing diagram corresponding to the receiver of FIG. 7. FIG. 8 shows the amplitude relationship between the incoming encoded signal (shown as a solid line) and recovered clock w (shown as a dashed line) together with the data signal x, y, and z as described above. The short pulses shown in data signal z are removed by data filter 702.

Figure 9:
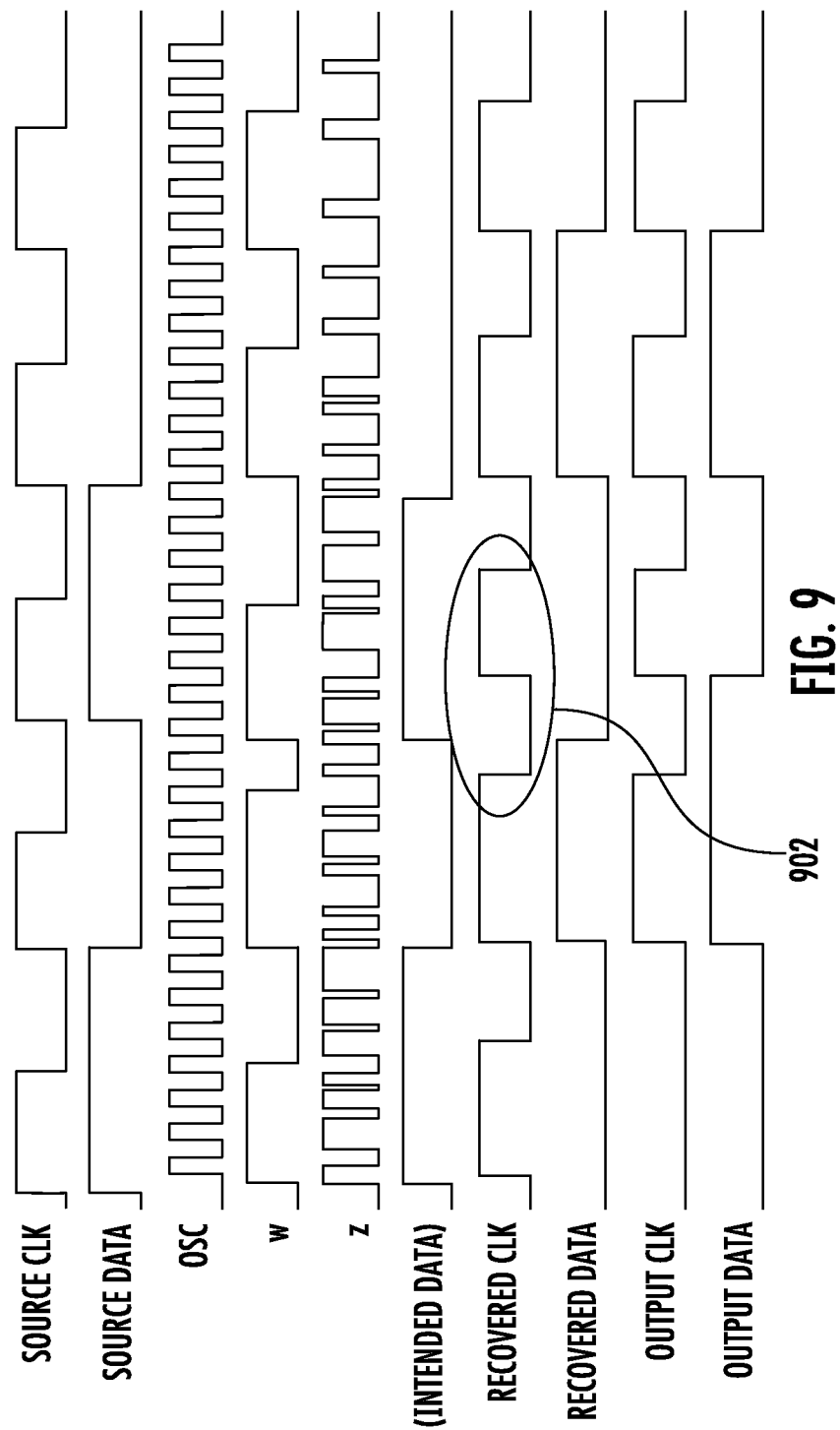

FIG. 9 is another exemplary timing diagram corresponding to the receiver of FIG. 7. In this example, the input and output signal relationships are shown for the receiver 700 as part of a daisy chain communication system, such as in FIG. 1C. An additional function of receiver 700 is to guarantee a minimum pulse width such that pulse widths shorter than a specified length are reproduced at the minimum allowed width. This is applied to both positive and negative pulses and is needed to limit the cumulative effects of clock jitter caused by extraneous noise sources such as EMI. The minimum pulse width is dependent on the daisy chain clock frequency and is generated by a number of cycles of the oscillator 710. For example, having a 500 kHz daisy chain clock and a 4 MHz system oscillator 710 (the rate of the daisy chain clock=oscillator rate/8) results in a minimum pulse width of 3 oscillator cycles guarantee correct operation with oscillator tolerances up to 15%. The oscillator 710 runs continuously while the transceiver is in normal communication mode. The second decoding function recovers the data signal (see, for example data decoders 238 and 278 of FIGS. 2A and 2B). In FIG. 9, pulse 902 has been modified to minimum width from the corresponding pulse in signal w, which was a short pulse.

In one embodiment the incoming differential signal is converted to single ended signal and mixed with the recovered clock to recreate the data signal. The incoming signal is scaled correctly for this process. A value for the gain 706 of, for example, 0.866 in FIG. 7, described above, provides the correct level for the circuit of FIG. 2B with 2.5 mA unit current and is referred to a 1 V peak-to-peak recovered clock signal with the external circuit elements given in Table I above.

Figure 10:
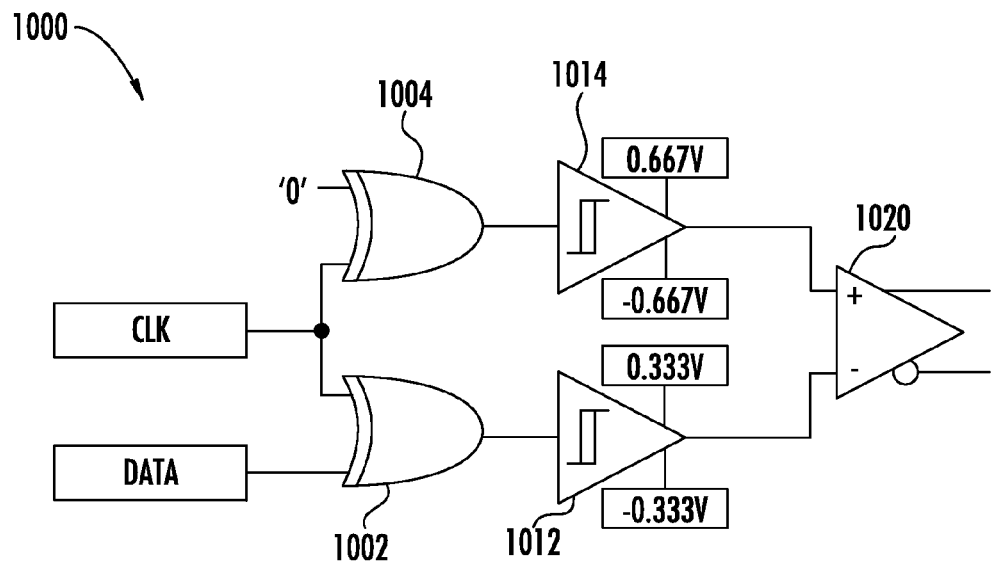
FIG. 10 is a schematic diagram of another embodiment of an encoder for use with the transceiver of FIG. 2A.

FIG. 10 is a schematic diagram of one embodiment of an encoder 1000. Encoder 1000 comprises a logic and voltage summing node that mixes the CLK and a Manchester encoded data signal to create the hybrid encoded signal. An XOR gate 1002 receives the CLK and data signals and output a Manchester encoded data signal. This signal is inputted to a zero crossing detector 1012 that converts the Manchester encoded data signal to a voltage level programmed signal. In this embodiment, zero crossing detector 1012 outputs a 0.333 V signal for a logic high input and −0.333 V signal for a logic low input.

Similarly, XOR gate 1004 outputs a signal to zero crossing detector 1014 based on the combination of a logic low signal and the CLK signal. Zero crossing detector 1014 outputs a 0.667 V signal for a logic high input and −0.667 V signal for a logic low input. Amplifier 1020 sums the signals from zero crossing detectors 1014 and 1012 together and outputs an amplitude modulated hybrid encoded data signal. The properties of the hybrid encoded data signal are such that a zero crossing is provided at each clock edge while maintaining full data integrity.

In this exemplary embodiment, the encoder 1000 has a 2:1 relationship of the encoded data scaling values of the zero crossing detectors 1014 and 1012, respectively, that provides good noise rejection. The absolute values of these factors may be chosen to provide a nominal 2 V peak-to-peak signal at each output (4 V peak-to-peak differential). Increasing this output swing further improve robustness when the receiver voltage swing is similarly scaled. The voltage swing at the receiver (for example, receiver 230) is smaller than that at the transmitter (for example, transmitter 210) and is determined by the ratio value of external components (for example, the resistors in FIG. 1).

Figure 11:
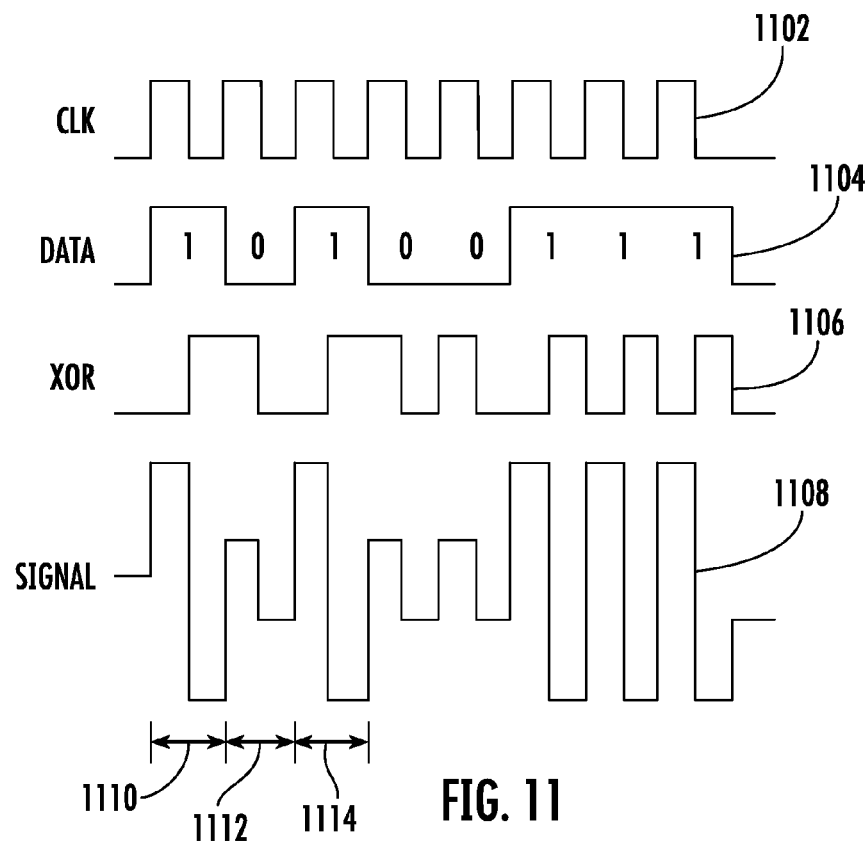
FIG. 11 is an exemplary timing diagram for the encoder of FIG. 10.

FIG. 11 shows an example of the various signals associated with the encoder shown in FIG. 10. FIG. 11 illustrates a clock signal 1102, a data signal 1104, an XOR signal 1106, and the output signal 1108. In an example, the XOR signal 1106 comprises a Manchester encoded data signal outputted by the XOR gate 1002.

The signal 1108 is the hybrid encoded data signal output by the amplifier 1020. The signal 1108 is an amplitude modulated square wave signal, where different voltage levels for a square wave pulse correspond to different data values. As an amplitude modulated square wave signal, the amplitude of signal 1108 corresponds to a data value (e.g., a digital value). In an example, the voltage levels associated with a digital 0 and a digital 1 may be +/−1V and +/−3V respectively.

The signal 1108 can include a plurality of pulses 1110, 1112, 1114. Each pulse 1110, 1112, 1114 corresponds to a cycle of the clock signal 1102. A pulse comprises a positive and negative voltage swing in the output signal 1108. In the example shown, the initial pulse 1110 corresponds to a digital 1 which is represented by a high voltage level (e.g., a positive and negative 3 volt swing). The initial pulse 1110, therefore, rises up to +3V and drops down to −3V. Thus, the initial pulse 1110 maintains a balanced signal, reaching +3 volt and −3 volt.

Subsequent pulses 1112 and 1114 can have a substantially balanced signals as well. This is done to produce a DC balanced output signal 1108. That is, this can be done to produce an output signal 1108 that is substantially centered around 0 v. In the example, signal 1108, the second pulse 1112 corresponds to a digital 0 which is represented by a low voltage level (e.g., a positive and negative 1 volt swing). Accordingly, the hybrid encoded data signal 1108 is an amplitude modulated signal.

Figure 12:
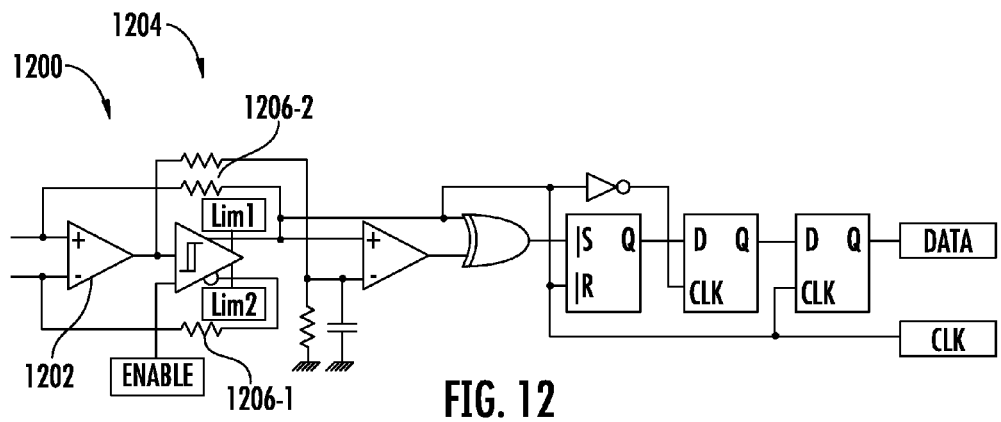
FIG. 12 is a schematic diagram of one embodiment of a decoder for use with the transceiver of FIG. 2A.

FIG. 12 is a schematic diagram of one embodiment of a decoder 1200. The decoder 1200 comprises a differential input stage 1202 followed by a limiting stage 1204 with differential outputs. Decoder 1200 provides load termination for the differential input signals at the nominal bus idle voltages which allows use of the receiver with alternate (e.g., capacitive) coupling circuit arrangements. The bus idle voltage termination circuit is typically not used in the system of FIG. 1. In one embodiment, the resistors 1206-1 and 1206-2 in decoder 1200 have nominally high values, for example, 100 kΩ. The limit values are the bus idle condition value at the receiver input and its compliment. An enable circuit detects the arrival of the first transmission edge and enables the limiting stage 1204. The limiting stage 1204 is disabled, such that the outputs conform to the bus idle condition following data transmission. The bus is always in the idle state at the end of a transmission. The enable circuit primarily provides the correct initial condition on device startup and also corrects any faulty bus idle conditions.

Figure 13:
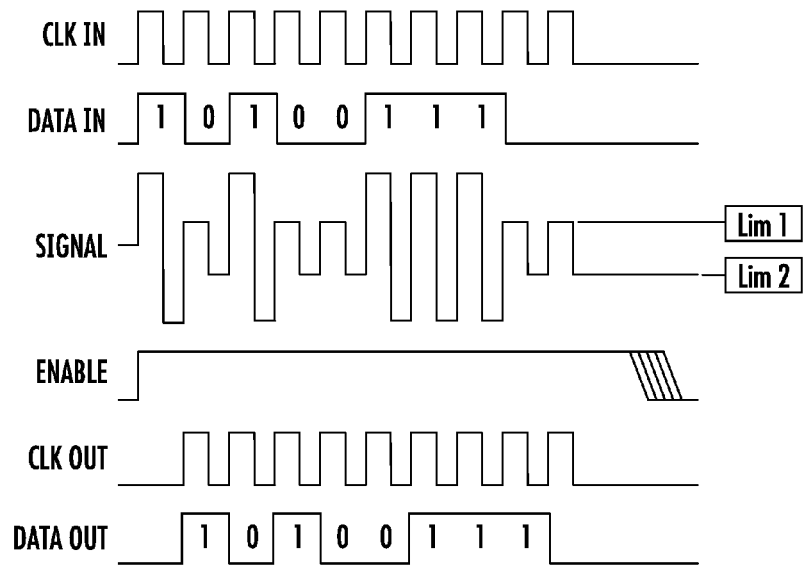
FIG. 13 is an exemplary timing diagram for the decoder of FIG. 12.

FIG. 13 is an exemplary timing diagram for the decoder of FIG. 12. Note that the output data signal is delayed by one clock cycle from the input signal. The source clock is extended by one clock cycle to facilitate decoding with the delayed data output. In this embodiment, all communication sequences are multiples of 8 bits.

Figure 14:
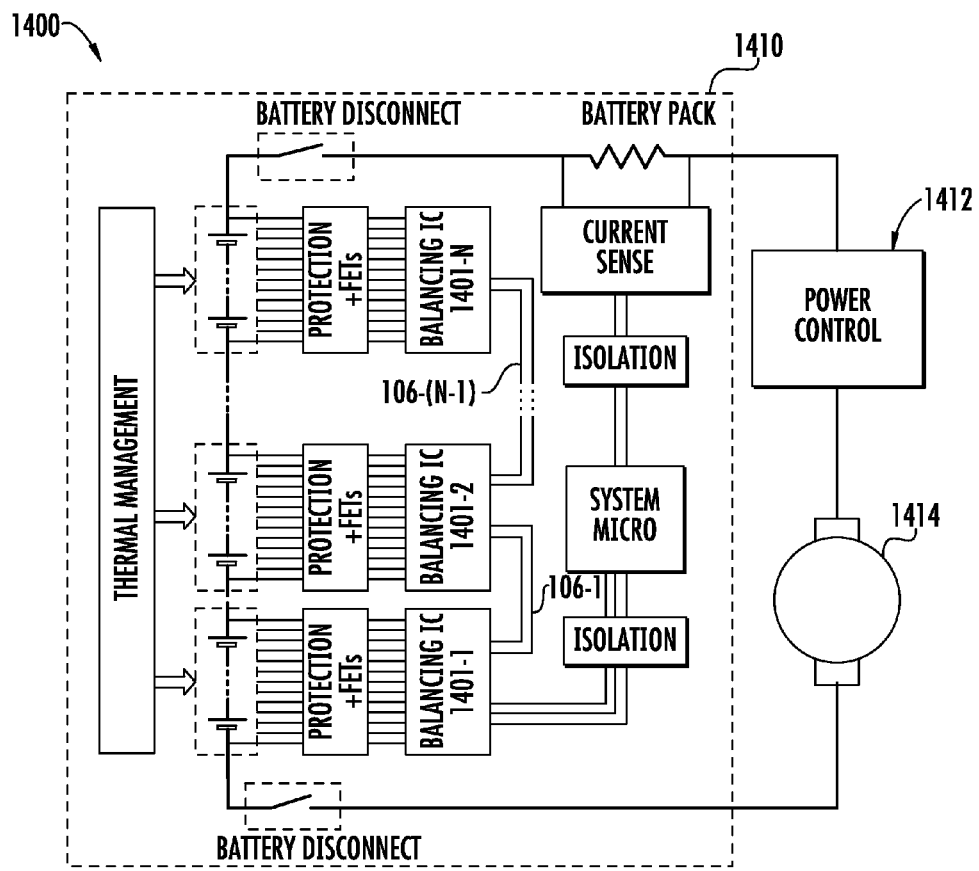
FIG. 14 is a block diagram of one embodiment of a battery for use with the system of FIG. 1C.

FIG. 14 is a block diagram of one embodiment of an electrical system 1400. Electrical system 1400 comprises a Lithium (Li) ion battery pack 1410, a power control 1412, and a motor 1414. The Li-ion battery pack 1410 is adapted to include a number of balancing integrated circuits (ICs) 1401-1, 1401-2, to 1401-N, that are connected via a robust 2-wire daisy chain communication system (100, 150). The balancing ICs 1401-1, 1401-2, to 1401-N monitor the cells in the battery 1410. The balancing ICs 1401-1, 1401-2, to 1401-N each comprise one or more transceivers and are connected in a daisy chain manner with communication mediums 106-1 to 106-N-1. Accordingly, the plurality of balancing ICs 1401-1, 1401-2, to 1401-N and communication mediums 106-1 to 106-N-1 can correspond to the daisy chain system 140 of FIG. 1C. That is, a balancing IC 1401-1 can include a device 142-1 coupled to a transceiver 150-1 where a first transceiver 150-1 of a first balancing IC 1401-1 can be coupled to a second transceiver 150-2 of second balancing IC 1401-2.

One implementation of the electrical system 1400 is in a hybrid electric vehicle. In this embodiment, the battery pack 1410 is a high voltage battery system that handles up to 400 V. There is a balancing IC 1401-1, 1401-2, 1401-N for each set of 12 battery cells that communicate through the daisy chain system described above. The difference in voltage between the top of the daisy chain and the bottom is 400 V, in levels of 40 V each. Due to the reactive nature of Lithium in the Li-ion battery 1410, there is a risk of explosion if the battery 1410 is overheated or overcharged. Embodiments of the isolated communication system described herein facilitate control against such explosions through the use of the monitoring and charge depletion functions of balancing ICs 1401-1, 1401-2, 1401-N.

Figure 15:
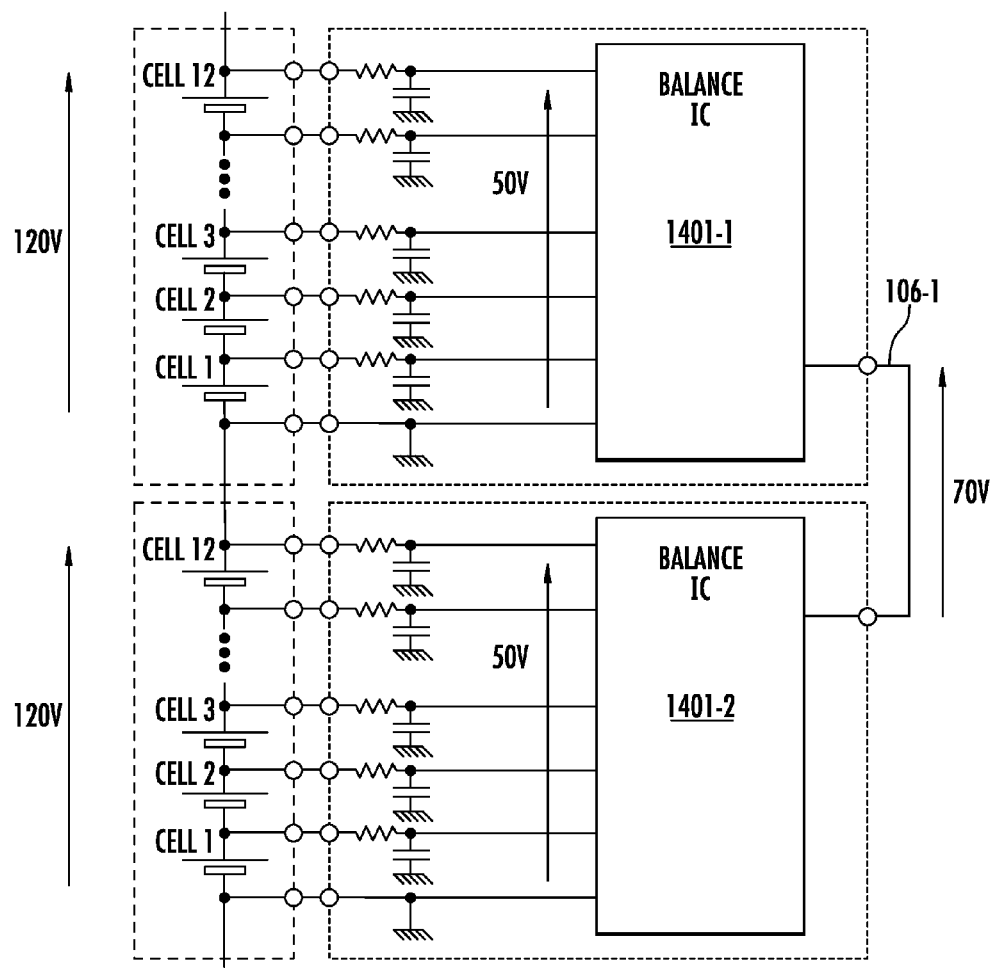
FIG. 15 is a block diagram of one embodiment of two cells of the battery of FIG. 14.

In another embodiment, the battery management system 1400 is installed in a gas-electric hybrid or electric vehicle. FIG. 15 provides more details of the connections between balance ICs 1401-1 and 1401-2 of FIG. 14 for a 12-cell system. If the voltage source is suddenly disconnected, an inductive spike could propagate through the battery pack 1410. The normal 40 V could spike to 120 V, and any connection between the balancing ICs 1401-1, 1401-2, 1401-N sees a proportion of the spike. In one example, communication medium 106-1 sees an instantaneous spike of 70 V. Because the communication system is fully electrically isolated and protected against this level of voltage transient, the communication system should survive the transient without damage, and does not expose the electronics to dangerous voltage or temperature.

Figure 16:
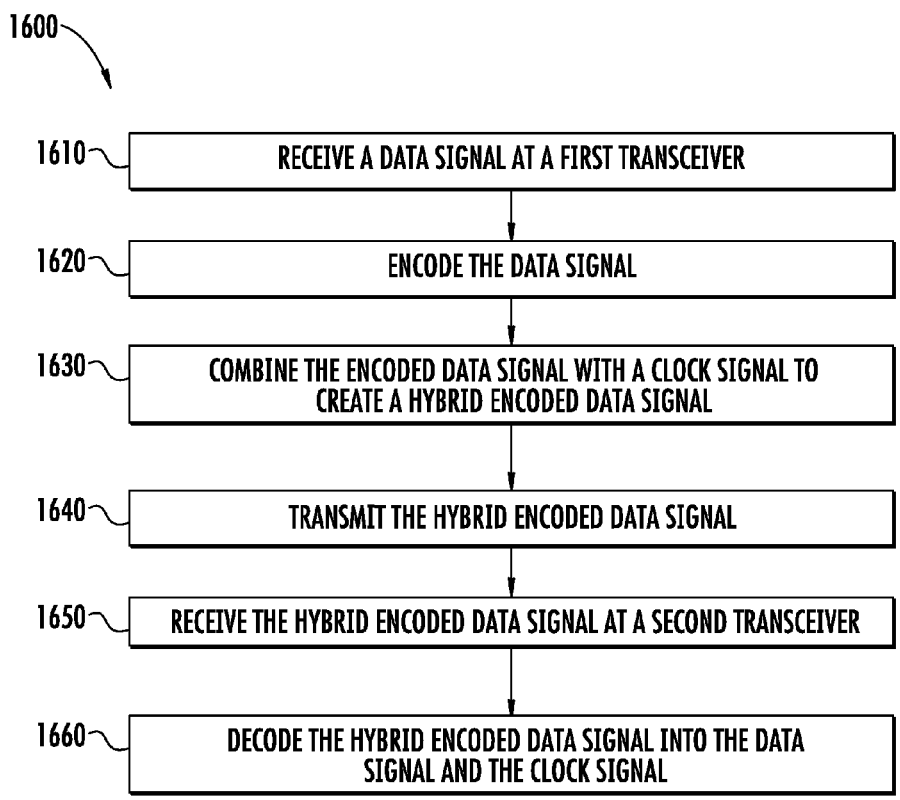
FIG. 16 is a flowchart of one embodiment of a method of transmitting data over the isolated communication systems of FIGS. 1A, 1B, and 1C.

FIG. 16 is a flowchart of one embodiment of a method 1600 of transmitting data over an isolated communication system (for example, communication system 100, 170). A data signal is received at a first transceiver, for example first transceiver 102 (block 1610). The first transceiver encodes the data signal (block 1620) and combines it with a clock signal to create a hybrid encoded data signal (block 1630). The first transceiver transmits the hybrid encoded data signal (block 1640). The hybrid encoded data signal is transmitted, for example, through the differential and AC coupling network that connects the first transceiver 102 to the second transceiver 104 through communication medium 106. The second transceiver receives the hybrid encoded data signal (block 1650). The second transceiver extracts the clock signal and decodes the data signal (block 1660). In one embodiment, the clock signal is extracted by detecting zero-crossings of the hybrid encoded data signal.

The embodiments described herein provide improved isolated communication, reducing EMI emissions and sensitivity, and increased transient voltage protection. Some embodiments provide a differential AC coupling network that rejects EMI at the receiver and divides the effects of transients between the ends of the communication medium. The embodiments described herein are not limited by the type of integrated circuit. Nor are the embodiments limited to any specific type of process technology, e.g., CMOS, Bipolar, or BICMOS that may be used to manufacture the present disclosure. Other additions, subtractions or modifications are obvious in view of the present disclosure and are intended to fall within the scope of the appended claims.

A number of embodiments of the invention defined by the following claims have been described. Nevertheless, it will be understood that various modifications to the described embodiments may be made without departing from the spirit and scope of the claimed invention. Features and aspects of particular embodiments described herein can be combined with or replace features and aspects of other embodiments. Accordingly, other embodiments are within the scope of the following claims.

What is claimed is:

1. A method for transmitting a signal, the method comprising:
generating a Manchester encoded data stream;
combining the Manchester encoded data stream with an amplified clock signal to produce an amplitude modulated signal having a zero crossing at each edge of the amplified clock signal, wherein combining the Manchester encoded data stream with an amplified clock signal includes subtracting the voltage of the Manchester encoded data stream from the voltage of the amplified clock signal; and
sending the amplitude modulated signal over a communication medium.

2. The method of claim 1, comprising:
amplifying a clock signal to produce the amplified clock signal, wherein amplifying includes producing a signal having a peak-to-peak amplitude greater than a peak-to-peak amplitude of the Manchester encoded data stream.

3. The method of claim 1, wherein sending the amplitude modulated signal includes sending the amplitude modulated signal as a square wave.

4. The method of claim 2, wherein amplifying includes producing a signal having a peak-to-peak amplitude twice that of the peak-to-peak amplitude of the Manchester encoded data stream.

5. The method of claim 2, wherein generating a Manchester encoded data stream includes XORing the clock signal with a data signal.

6. A method for transmitting an amplitude modulated signal, the method comprising:
encoding a data signal to produce a DC balanced data signal;
combining the DC balanced data signal with a clock signal to produce a plurality of square wave pulses having edges corresponding to edges of the clock signal and amplitudes corresponding to a digital value of the data signal, wherein each of the plurality of square wave pulses has an amplitude larger than a threshold amplitude to represent a first digital level of the data signal, and each of the plurality of square wave pulses has an amplitude smaller than the threshold amplitude to represent a second digital level of the data signal; and
transmitting the plurality of square wave pulses.

7. The method of claim 6, wherein the threshold amplitude when positive corresponds to a positive voltage level and when negative corresponds to a negative voltage level, and wherein transmitting a plurality of square wave pulses includes:
transmitting a pulse having a positive amplitude above the positive voltage level when the data signal and the clock signal are at the first digital level;
transmitting a pulse having a negative amplitude below the negative voltage level when the data signal is at the first digital level and the clock signal is at a second voltage level;

transmitting a pulse having a positive amplitude below the positive voltage level when the data signal is at the second digital level and the clock signal is at the first digital level; and transmitting a pulse having a negative amplitude above the negative voltage level when the data signal and the clock signal are at the second digital level.

8. The method of claim 7, wherein transmitting a pulse having a positive amplitude above the positive voltage level includes transmitting a pulse having about three times the amplitude of a pulse having a positive amplitude below the positive voltage level.

9. A transmitter comprising:

an encoding circuit configured to receive a clock stream and a data stream, the encoding circuit configured to combine the clock stream and data stream into one or more intermediate signals; and a plurality of current sources coupled to the encoding circuit and configured to receive the intermediate signals, wherein the encoding circuit and plurality of current sources are configured to generate an amplitude modulated signal having edges corresponding to edges of the clock stream and an amplitude corresponding to the data stream.

10. The transmitter of claim 9, wherein the one or more intermediate signals include a Manchester encoded stream.

11. The transmitter of claim 9, wherein the plurality of current sources are configured to generate a pulse having an amplitude larger than a threshold amplitude when the data stream is at a first digital level, and transmitting a pulse having an amplitude smaller than the threshold amplitude when the data stream is at a second digital level.

12. The transmitter of claim 9, wherein the plurality of current sources include a first current source and a second current source, the second current source configured to generate a greater current than the first current source;

wherein the one or more intermediate signals include control signals coupled to the first and second current sources, the control signals configured to switch the first current source based on the data stream being at a first digital level and to switch the second current source based on the data stream being at a second digital level.

13. The transmitter of claim 9, wherein the one or more intermediate signals are configured to generate a square wave signal with the one or more current sources.

* * * * *